(12) United States Patent
Patel

(10) Patent No.: US 7,014,696 B2
(45) Date of Patent: Mar. 21, 2006

(54) COMPOUNDS, COMPOSITIONS AND USES

(75) Inventor: Prakash Patel, Manchester (GB)

(73) Assignee: Avecia Limited, Manchester (GB)

( * ) Notice: Subject to any disclaimer, the term of this patent is extended or adjusted under 35 U.S.C. 154(b) by 0 days.

(21) Appl. No.: 10/503,722

(22) PCT Filed: Jan. 23, 2003

(86) PCT No.: PCT/GB03/00203

§ 371 (c)(1),
(2), (4) Date: Aug. 6, 2004

(87) PCT Pub. No.: WO03/068866

PCT Pub. Date: Aug. 21, 2003

(65) Prior Publication Data

US 2005/0081748 A1     Apr. 21, 2005

(30) Foreign Application Priority Data

Feb. 13, 2002 (GB) ................................ 0203356
Feb. 13, 2002 (GB) ................................ 0203357

(51) Int. Cl.
C09D 11/02 (2006.01)
C09B 47/04 (2006.01)

(52) U.S. Cl. .................... 106/31.49; 106/31.78; 540/130; 540/128

(58) Field of Classification Search ............ 106/31.49, 106/31.78; 540/128, 130, 132, 133
See application file for complete search history.

(56) References Cited

U.S. PATENT DOCUMENTS 3,238,221 A      3/1966  Schmitz et al. ............ 540/134
4,743,684 A      5/1988  Niwa et al. ................. 540/126
5,123,960 A *    6/1992  Shirota et al. ............ 106/31.46
6,235,097 B1 *   5/2001  Kenworthy et al. ..... 106/31.49
2005/0126436 A1* 6/2005  Patel et al. .............. 106/31.49

FOREIGN PATENT DOCUMENTS

| EP | 0196901 A | 10/1986 |
| EP | 1036824 | 9/2000 |
| FR | 2168198 | 8/1973 |
| JP | 08/295819 | * 11/1996 |
| WO | WO9713811 | 4/1997 |
| WO | WO9849239 | 11/1998 |
| WO | WO9849240 | 11/1998 |
| WO | WO0008101 | 2/2000 |

OTHER PUBLICATIONS

Ab of JP 08/295819 from Patent Abstracts of Japan; Nov. 1996.*

* cited by examiner

*Primary Examiner*—Helene Klemanski
(74) *Attorney, Agent, or Firm*—Morgan, Lewis & Bockius LLP

(57) ABSTRACT

A compound of Formula (1) and salts thereof: wherein: M is 2H, Si, a metal, an oxymetal group, a hydroxymetal group or a halometal group; Pc represents a phthalocyanine nucleus of Formula (2); $R^1$, $R^2$ and $R^3$ independently are H or optionally substituted $C_{1-4}$ alkyl; $R^4$ is an optionally substituted cyclic or an optionally substituted acyclic alkene optionally interrupted with a hetero atom; x and z are both greater than 0; y is 0 to 4; and the sum of (x+y+z) is 2 to 5. Also compositions and inks comprising compounds of Formula (1); processes for printing these compositions and substrates printed with said compositions and inks; and ink jet printer cartridges.

15 Claims, No Drawings

COMPOUNDS, COMPOSITIONS AND USES

This invention relates to compounds, to compositions containing these compounds, to inks, to printing processes, to printed substrates and to ink-jet printer cartridges.

Ink-jet printing is a non-impact printing technique in which droplets of ink are ejected through a fine nozzle onto a substrate without bringing the nozzle into contact with the substrate.

There are many demanding performance requirements for dyes and inks used in ink-jet printing. For example they desirably provide sharp, non-feathered images having good water light and ozone fastness and optical density. The inks are often required to dry quickly when applied to a substrate to prevent smudging, but they should not form a crust over the tip of an ink-jet nozzle because this will stop the printer from working. The inks should also be stable to storage over time without decomposing or forming a precipitate that could block the fine nozzle. Dyes containing a single copper phthalocyanine group and their use in ink-jet printing are known. For example, C.I. Direct Blue 199 and C.I. Direct Blue 86 are used as colorants in commercial ink-jet printing inks.

A particular problem for photorealistic quality printing is that of light-fastness. Prints are often exposed to daylight for long periods and there is a need for the image to have as good light-fastness as possible. The colorants in the print reacting with atmospheric ozone can play a major role in poor light-fastness.

According to the present invention there is provided a compound of Formula (1) and salts thereof:

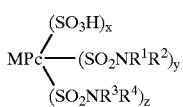

Formula (1)

wherein:

M is 2H, Si, a metal, an oxymetal group, a hydroxymetal group or a halometal group;

Pc represents a phthalocyanine nucleus of Formula (2);

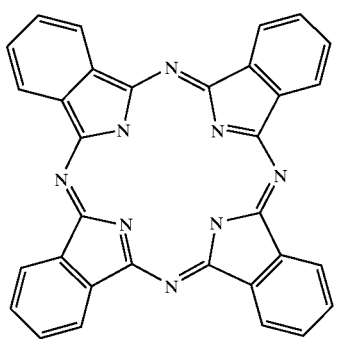

Formula (2)

$R^1$, $R^2$ and $R^3$ independently are H or optionally substituted $C_{1-4}$alkyl;

$R^4$ is an optionally substituted cyclic or an optionally substituted acyclic alkene, optionally interrupted with a hetero atom;

x and z are both greater than 0;
y is 0 to 4; and
the sum of (x+y+z) is 2 to 5.

M is preferably 2Li, 2Na, 2K, Mg, Ca, Ba, Al, Si, Sn, Pb, Rh, Sc, Ti, V, Cr, Mn, Fe, Co, Ni, Cu, Zn, AlX, GaX, InX or SiX$_2$, where in X is OH or Cl, more preferably Sc, Ti, Va, Cr, Mn, Fe, Co, Zn, Ni and Cu and especially Cu or Ni.

Preferably $R^1$, $R^2$ and $R^3$ independently are H or methyl.

Preferably $R^1$ and $R^2$ are both H.

In one preferred embodiment $R^4$ is optionally substituted $C_{2-18}$ straight or branched chain alkene or more preferably $R^4$ is optionally substituted $C_{2-12}$ straight or branched chain alkene it is especially preferred that $R^4$ is optionally substituted $C_{3-6}$ straight chain alkene.

In another preferred embodiment $R^4$ is an optionally substituted $C_{2-18}$ straight or branched chain alkene interrupted with NH. In this embodiment $R^4$ is more preferably $(CH_2)_nNH(CH_2)_pCHCH(CH_2)_qH$ wherein n is 1 to 3, and p and q are each independently 0 or 1.

Preferred optional substituents which may be present on $R^1$, $R^2$, $R^3$ and $R^4$ are selected from: alkoxy, preferably $C_{1-4}$-alkoxy; polyalkylene oxide; nitro; cyano; sulpho; halo, especially bromo, chloro or fluoro; ureido; SO$_2$F; hydroxy; ester, more preferably —CO$_2$(C$_{1-4}$-alkyl); and —NR$^5$R$^6$, —COR$^5$, —CONR$^5$R$^6$ and —SO$_2$NR$^5$R$^6$ wherein R$^5$ and R$^6$ are each independently H or alkyl, preferably H or C$_{1-4}$-alkyl. Optional substituents for any of the substituents described for $R^1$, $R^2$, $R^3$ and $R^4$ may be selected from the same list of substituents.

Preferably x is 0.2 to 3.8, more preferably 0.5 to 3.5, especially 1 to 3 and more especially 1 to 2.

Preferably y is 0.2 to 3.8, more preferably 0.5 to 3.5, especially 1 to 3 and more especially 1 to 2.

Preferably z is 0.2 to 3.8, more preferably 0.5 to 3.5, especially 1 to 3 and more especially 1 to 2.

The sum of (x+y+z) is preferably 2 to 4, more preferably 3 to 4.

Acid or basic groups on the compounds of Formula (1), particularly acid groups, are preferably in the form of a salt. Thus, the Formulae shown herein include the compounds in free acid and in salt form.

Preferred salts are alkali metal salts, especially lithium, sodium and potassium, ammonium and substituted ammonium salts (including quaternary amines such as $((CH_3)_4N^+)$ and mixtures thereof. Especially preferred are salts with sodium, lithium, ammonia and volatile amines, more especially sodium salts. The compounds may be converted into a salt using known techniques.

The compounds of Formula (1) may exist in tautomeric forms other than those shown in this specification. These tautomers are included within the scope of the present invention.

The compounds of Formula (1) have attractive, strong cyan shades and are valuable colorants for use in the preparation of ink-jet printing inks. They benefit from a good balance of solubility, storage stability and fastness to water and light. In particular they display excellent light and ozone fastness. Furthermore they may be prepared from cheap intermediates, avoiding the complexity and expense which is involved in manufacturing some of the more elaborate phthalocyanines.

According to a second aspect of the present invention there is provided a composition comprising a compound according to the first aspect of the invention and a medium, preferably a liquid medium.

Preferred compositions comprise:
(a) from 0.01 to 30 parts of a compound according to the first aspect of the invention; and
(b) from 70 to 99.99 parts of a liquid medium;

wherein all parts are by weight and the number of parts of (a)+(b)=100.

The number of parts of component (a) is preferably from 0.1 to 20, more preferably from 0.5 to 15, and especially from 1 to 5 parts. The number of parts of component (b) is preferably from 99.9 to 80, more preferably from 99.5 to 85, especially from 99 to 95 parts.

Preferably component (a) is completely dissolved in component (b). Preferably component (a) has a solubility in component (b) at 20° C. of at least 10%. This allows the preparation of liquid dye concentrates that may be used to prepare more dilute inks and reduces the chance of the dye precipitating if evaporation of the liquid medium occurs during storage.

Preferred liquid media include water, a mixture of water and organic solvent or organic solvent free from water.

When the medium comprises a mixture of water and organic solvent, the weight ratio of water to organic solvent is preferably from 99:1 to 1:99, more preferably from 99:1 to 50:50 and especially from 95:5 to 80:20.

It is preferred that the organic solvent present in the mixture of water and organic solvent is a water-miscible organic solvent or a mixture of such solvents. Preferred water-miscible organic solvents include $C_{1-6}$-alkanols, preferably methanol, ethanol, n-propanol, isopropanol, n-butanol, sec-butanol, tert-butanol, n-pentanol, cyclopentanol and cyclohexanol; linear amides, preferably dimethylformamide or dimethylacetamide; ketones and ketone-alcohols, preferably acetone, methyl ether ketone, cyclohexanone and diacetone alcohol; water-miscible ethers, preferably tetrahydrofuran and dioxane; diols, preferably diols having from 2 to 12 carbon atoms, for example pentane-1,5-diol, ethylene glycol, propylene glycol, butylene glycol, pentylene glycol, hexylene glycol and thiodiglycol and oligo- and poly-alkyleneglycols, preferably diethylene glycol, triethylene glycol, polyethylene glycol and polypropylene glycol; triols, preferably glycerol and 1,2,6-hexanetriol; mono-$C_{1-4}$-alkyl ethers of diols, preferably mono-$C_{1-4}$-alkyl ethers of diols having 2 to 12 carbon atoms, especially 2-methoxyethanol, 2-(2-methoxyethoxy)ethanol, 2-(2-ethoxyethoxy)-ethanol, 2-[2-(2-methoxyethoxy)ethoxy]ethanol, 2-[2-(2-ethoxyethoxy)-ethoxy]-ethanol and ethyleneglycol monoallylether; cyclic amides, preferably 2-pyrrolidone, N-methyl-2-pyrrolidone, N-ethyl-2-pyrrolidone, caprolactam and 1,3-dimethylimidazolidone; cyclic esters, preferably caprolactone; sulphoxides, preferably dimethyl sulphoxide and sulpholane. Preferably the liquid medium comprises water and 2 or more, especially from 2 to 8, water-miscible organic solvents.

Especially preferred water-miscible organic solvents are cyclic amides, especially 2-pyrrolidone, N-methyl-pyrrolidone and N-ethyl-pyrrolidone; diols, especially 1,5-pentane diol, ethyleneglycol, thiodiglycol, diethyleneglycol and triethyleneglycol; and mono-$C_{1-4}$-alkyl and $C_{1-4}$-alkyl ethers of diols, more preferably mono-$C_{1-4}$-alkyl ethers of diols having 2 to 12 carbon atoms, especially 2-methoxy-2-ethoxy-2-ethoxyethanol.

Examples of further suitable liquid media comprising a mixture of water and one or more organic solvents are described in U.S. Pat. No. 4,963,189, U.S. Pat. No. 4,703,113, U.S. Pat. No. 4,626,284 and EP 4,251,50A.

When the liquid medium comprises an organic solvent free from water, (i.e. less than 1% water by weight) the solvent preferably has a boiling point of from 300 to 200° C., more preferably of from 400 to 150° C., especially from 50 to 125° C. The organic solvent may be water-immiscible, water-miscible or a mixture of such solvents. Preferred water-miscible organic solvents are any of the hereinbefore-described water-miscible organic solvents and mixtures thereof. Preferred water-immiscible solvents include, for example, aliphatic hydrocarbons; esters, preferably ethyl acetate; chlorinated hydrocarbons, preferably $CH_2Cl_2$; and ethers, preferably diethyl ether; and mixtures thereof.

When the liquid medium comprises a water-immiscible organic solvent, preferably a polar solvent is included because this enhances solubility of the compound in the liquid medium. Examples of polar solvents include $C_{1-4}$-alcohols.

In view of the foregoing preferences it is especially preferred that where the liquid medium is an organic solvent free from water it comprises a ketone (especially methyl ethyl ketone) &/or an alcohol (especially a $C_{1-4}$-alkanol, more especially ethanol or propanol).

The organic solvent free from water may be a single organic solvent or a mixture of two or more organic solvents. It is preferred that when the medium is an organic solvent free from water it is a mixture of 2 to 5 different organic solvents. This allows a medium to be selected that gives good control over the drying characteristics and storage stability of the ink.

Liquid media comprising an organic solvent free from water are particularly useful where fast drying times are required and particularly when printing onto hydrophobic and non-absorbent substrates, for example plastics, metal and glass.

The liquid media may also contain additional components conventionally used in ink jet printing inks, for example viscosity and surface tension modifiers, corrosion inhibitors, biocides, kogation reducing additives and surfactants which may be ionic or non-ionic.

Although not usually necessary, further colorants may be added to the composition to modify the shade and performance properties. Examples of such colorants include C.I.Direct Yellow 86, 132, 142 and 173; C.I.Direct Blue 199, and 307; C.I.Food Black 2; C.I.Direct Black 168 and 195; C.I.Acid Yellow 23; and any of the dyes used in ink jet printers sold by Seiko Epson Corporation, Hewlett Packard Company, Canon Inc. & Lexmark International. Addition of such further dyes can increase overall solubility leading to less kogation (nozzle blockage) for the resultant ink.

It is preferred that the composition according to the second aspect of the invention is an ink suitable for use in an ink jet printer.

Thus, preferably the ink has a viscosity of less than 20 cP, more preferably less than 10 cP, especially less than 5 cP, at 25° C. These low viscosity inks are particularly well suited for application to substrates by means of ink jet printers.

Preferably the ink contains less than 500 ppm, more preferably less than 250 ppm, especially less than 100 μm, more especially less than 10 ppm in total of divalent and trivalent metal ions (other than any divalent and trivalent metal ions bound to a component of the ink).

Preferably the ink has been filtered through a filter having a mean pore size below 10 μm, more preferably below 3 μm, especially below 2 μm, more especially below 1 μm. This filtration removes particulate matter that could otherwise block the fine nozzles found in many ink-jet printers.

Preferably the ink contains less than 500 ppm, more preferably less than 250 ppm, especially less than 100 pm, more especially less than 10 ppm in total of halide ions.

A third aspect of the invention provides a process for forming an image on a substrate comprising applying an ink according to the second aspect of the invention thereto by means of an ink jet printer.

The ink-jet printer preferably applies the ink to the substrate in the form of droplets that are ejected through a small orifice onto the substrate. Preferred ink-jet printers are piezoelectric ink-jet printers and thermal ink-jet printers. In thermal ink-jet printers, programmed pulses of heat are applied to the ink in a reservoir by means of a resistor adjacent to the orifice, thereby causing the ink to be ejected from the orifice in the form of small droplets directed towards the substrate during relative movement between the substrate and the orifice. In piezoelectric ink-jet printers the oscillation of a small crystal causes ejection of the ink from the orifice. Alternately the ink can be ejected by an electro-mechanical actuator connected to a moveable paddle or plunger, for example as described in International Patent Application 00/48938 and International Patent Application 00/55089.

The substrate is preferably paper, plastic, a textile, metal or glass, more preferably paper, an overhead projector slide or a textile material, especially paper.

Preferred papers are plain or treated papers which may have an acid, alkaline or neutral character.

A fourth aspect of the present invention provides paper, plastic, a textile, metal or glass, more preferably paper, an overhead projector slide or a textile material, especially paper more especially plain, coated or treated papers printed with a composition according to the second aspect of the invention, a compound according to the first aspect of the invention or by means of a process according to third aspect of the invention.

A fifth aspect of the present invention provides an ink jet printer cartridge comprising a chamber and an ink wherein the ink is in the chamber and the ink is as described in the second aspect of the present invention.

The invention is further illustrated by the following Examples in which all parts and percentages are by weight unless otherwise stated.

EXAMPLE 1

Preparation of:

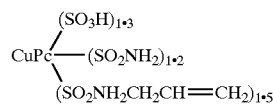

Stage 1

Chlorosulphonic acid (38.5 ml, 0.57 mole) was charged to a 250 ml 4-necked round-bottomed flask. $POCl_3$ (2.3 ml, 0.057 mole) was added dropwise with continuous mixing over 10–15 minutes while maintaining the temperature below 30° C. The reaction mixture was then stirred for a further 10 minutes. Copper phthalocyanine (14.4 g, 10.025 mole) (CuPc) was added portion wise, with stirring, over approximately 45 minutes while maintaining the temperature below 55° C. After this addition was complete the reaction mixture was stirred for a further 45 minutes and then warmed to 140±2° C. over approximately 20 minutes. The reaction mixture was held at this temperature for 4 hours with stirring and was then cooled to room temperature and left to stand overnight.

The next morning the reaction mixture was drowned out into ice/water/NaCl/cHCl (ratio 350 g/150 ml/12.5 g/3.5 ml) over approximately 30–45 minutes whilst maintaining the temperature below 0° C.

The precipitate was collected by filtration and washed with an ice-cold saturated brine solution (300 ml).

Stage II

Preparation of the Title Product

Allylamine (1.43 g, 0.025 moles) was added to a water (300 ml) and cooled to 0 to 5° C. The product obtained from stage I was added to this mixture and the pH was adjusted to the range of pH 7.8 to 8 using a 10% ammonia solution. The reaction mixture was then stirred at 0 to 5° C. for 3 hours, maintaining the pH at pH 7.8 to 8 by further additions of a 10% ammonia solution. After this time the reaction mixture was warmed to 40±2° C. over 45 minutes and was held at this temperature until the uptake of ammonia ceased. The reaction mixture was held at this temperature for a further hour and then cooled to room temperature overnight.

The pH of the reaction mixture was then adjusted to pH 1.5 to 2 using concentrated HCl and 20% NaCl w/v (150 g) was added. The precipitate that formed was collected by filtration and washed with saturated brine solution (300 ms) and then collected by filtration. The resultant paste was added to water (600 ml), the pH was adjusted to pH 9 to 9.5 with 2M NaOH, and then dialysed versus several changes of water over the course of 2 days. The precipitate was collected and dried in an oven at 50° C. to yield 22.76 g of the title product.

EXAMPLE 2

Preparation of:

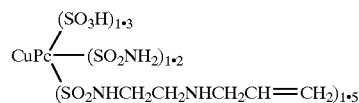

Allylamine (0.87 g, 0.015 moles) was added to a water/ice mixture (300 mls) at 0–5° C. C.I. Reactive Blue 25 (12.4 g 0.01 moles)

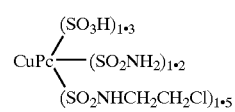

C.I. Reactive Blue 25 was then added to the mixture resulting in the pH dropping to pH2.5. The pH of the mixture was adjusted to pH 8.3 by the addition of a 10% ammonia solution. The reaction mixture was then heated to 70–75° C. and kept at this temperature for 4 hours, maintaining the pH at pH 8.3 by further addition of a 10% ammonia solution. After 4 hours the reaction mixture was cooled to room temperature and the pH adjusted to pH 1.6 with concentrated HCl. The resultant precipitate was collected by filtration and washed with 10% brine (200 ml). This precipitate was taken up in water (400 ml) and the pH was adjusted to pH 9.5 with 2M NaOH. This solution was dialysed against several changes of water and the precipitate was collected and dried in an oven at 50° C. to yield 9.57 g of the title product.

EXAMPLES 3 TO 5

Preparation of:

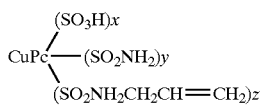

Compounds with varying values of x, y and z were prepared by repeating the procedure of Example 1 and varying the level of chlorosulphonic acid and $POCl_3$.

| Example | Chlorosulphonic acid | $POCl_3$ | x | y + z |
|---|---|---|---|---|
| 3 | 36.5 ml, 0.54 mole | 8.7 ml, 0.216 mole | 1 | 3 |
| 4 | 38 ml, 0.56 mole | 5.3 ml, 0.131 mole | 1.4 | 2.6 |
| 5 | 38.5 ml, 0.57 mole | 1.8 ml, 0.045 mole | 2 | 2 |

EXAMPLE 6

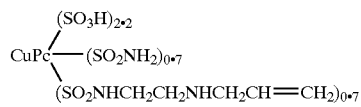

$POCl_3$ (9.3 g) was added, dropwise with stirring, over 15–20 minutes to chlorosulfonic acid (282 g) at room temperature. CuPc (58.8 g) was then added in portions over 30 min while the temperature was kept below 60° C. When all the CuPc had been added, the mixture was stirred at 40–50° C. for 10 minutes and then gradually heated to 139–140° C. and stirred for 3 hours. The mixture was then cooled to room temperature and allowed to stand overnight. The next day the mixture was added to an ice/water mixture (1.5 L) containing 20 g of NaCl and 15 ml of c HCl. The resultant suspension was stirred at 0° C. for 15–20 minutes and then collected by filtration before being washed with a solution of cold 10% brine acidified to pH1 to 2 with concentrated HCl. The resultant paste was immediately added to a solution of 2-chloroethylamine hydrochloride (70% w/w, 13.25 g) and ammonia (30% w/w solution, 4.6 g) in ice water (1.2 L) at 0–10° C. The pH was slowly adjusted to pH 7.5 with $Na_2CO_3$ and then stirred at 15° C. overnight. The next day the temperature of the reacton mixture was raised to 35–40° C. and the mixture was stirred for 5 hours maintaining the pH at pH8.5. The pH of the mixture was then adjusted to pH 7 with concentrated HCl and filtered. NaCl was added to the filtrate to 12.5% and the pH was adjusted to pH 1.5 (with concentrated HCl) with stirring. The precipitate which formed was filtered and washed with 10% NaCl acidified to pH1.5 with concentrated HCl. The damp solid was dried at room temperature.

EXAMPLE 7

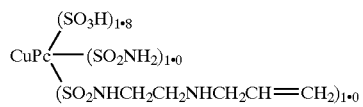

$POCl_3$ (58.3 g) was added dropwise, with stirring, over 15–20 minutes to chlorosulfonic acid (466 g) at room temperature. CuPc (58.8 g) was then added in portions over 30 min, keeping the temperature below 60° C. When all the CuPc had been added, the mixture was stirred at 60° C. for 15 minutes then gradually heated to 140° C. and stirred for 3 hours. The mixture was then cooled to room temperature and allowed to stand overnight. The next day the mixture was added to ice/water (1.6 L) containing 50 g of NaCl and 20 ml of c HCl. The resultant suspension was stirred at 0° C. for 15–20 minutes and then collected by filtration before being washed with a cold 3% solution of NaCl acidified to pH1 to 2 with concentrated HCl. The resultant paste was slowly added to a solution of 2-chloroethylamine hydrochloride (70% w/w, 28.4 g) in ice water (1.2 L) at 0–10° C. The pH was slowly adjusted to pH 7.5 with a 6% ammonia solution and then stirred for 3 hours. The pH of the mixture was adjusted to pH 1.5. The mixture was then stirred for 15 minutes. The precipitate which formed was filtered and washed with 5% NaCl adjusted to pH1.2 with concentrated HCl. The damp solid was dried at room temperature.

EXAMPLES 8 TO 13

Preparation of Inks 1, 3, 4, 5, 6 and 7

The compounds of Examples 1, 3, 4, 5, 6 and 7 (3.5 g) were dissolved in 100 ml of a liquid medium consisting of 2-pyrrolidone/thiodiglycol/Sufynol™ 465 in a weight ratio of 5:5:1 to give Inks 1 to 7 wherein Ink 1 contains the compound of Example 1, Ink 2 the compound of Example 2 and so on.

Preparation of the Comparative Ink

The Comparative Ink was formed by dissolving 3.5 g of Direct Blue 199 (PRO-JET™ Cyan 1 from Avecia Ltd.) (3.5 g) in 100 ml of a liquid medium consisting of 2-pyrrolidone/thiodiglycol/Sufynol™ 465 in a weight ratio of 5:5:1.

EXAMPLE 14

Ink-Jet Printing and Ozone Fastness

Inks 1, 3, 4, 5, 6 and 7 and the Comparative Ink were printed onto a variety of papers using a Canon 5800™ IJ printer. The printed substrate was then assessed for ozone stability using an ozone test cabinet from Hampden Test Equipment. The test was carried out for twenty four hours at 40° C. and 50% relative humidity in the presence of 1 part per million of ozone. Fastness of the printed ink to ozone was judged by the difference in the optical density before and after exposure to ozone using a Gretag MacBeth Spectrolino. Thus, the lower the % OD loss the greater the ozone fastness. Results are shown below in Table 2 and these clearly demonstrate that inks based on compounds of this invention display good ozone fastness.

TABLE 2

| Ink | Substrate | % OD loss |
|---|---|---|
| Ink 1 | HP Premium Plus | 1% |
| Ink 1 | SEC Premium Photo | 47% |
| Ink 3 | HP Premium Plus | 2% |
| Ink 3 | SEC Premium Photo | 28% |
| Ink 4 | HP Premium Plus | 3% |
| Ink 4 | SEC Premium Photo | 25% |
| Ink 5 | HP Premium Plus | 4% |
| Ink 5 | SEC Premium Photo | 55% |
| Ink 6 | HP Premium Plus | 4% |
| Ink 6 | SEC Premium Photo | 37% |
| Ink 7 | HP Premium Plus | −1% |
| Ink 7 | SEC Premium Photo | 13% |
| Comparative Ink | HP Premium Plus | 4% |
| Comparative Ink | SEC Premium Photo | 63% |

Examples

Further Inks

All the inks described in Tables 1 and 11 may be prepared using the compounds made in Examples 1 or 2 as dyes. Numbers quoted in the second column onwards refer to the number of parts of the relevant ingredient and all parts are by weight. The inks may be applied to paper by any method, such as thermal or piezo, of ink-jet printing. The following abbreviations are used in Table I and II:

PG=propylene glycol

DEG=diethylene glycol

NMP=N-methylpyrollidone

DMK=dimethylketone

IPA=isopropanol

MEOH=methanol

2P=2-pyrollidone

MIBK=methylisobutyl ketone

P12=propane-1,2-diol

BDL=butane-2,3-diol

CET=cetyl ammonium bromide

PHO=$Na_2HPO_4$ and

TBT=tertiary butanol

TDG=thiodiglycol

TABLE I

| Dye Content | Water | PG | DEG | NMP | DMK | NaOH | Na Stearate | IPA | MEOH | 2P | MIBK |
|---|---|---|---|---|---|---|---|---|---|---|---|
| 2.0 | 80 | 5 | | 6 | 4 | | | | | 5 | |
| 3.0 | 90 | | 5 | 5 | | 0.2 | | | | | |
| 10.0 | 85 | 3 | | 3 | 3 | | | | 5 | 1 | |
| 2.1 | 91 | | 8 | | | | | | | | 1 |
| 3.1 | 86 | 5 | | | | | 0.2 | 4 | | | 5 |
| 1.1 | 81 | | | 9 | | 0.5 | 0.5 | | | 9 | |
| 2.5 | 60 | 4 | 15 | 3 | 3 | | | 6 | 10 | 5 | 4 |
| 5 | 65 | | 20 | | | | | 10 | | | |
| 2.4 | 75 | 5 | 4 | | 5 | | | | 6 | | 5 |
| 4.1 | 80 | 3 | 5 | 2 | 10 | | 0.3 | | | | |
| 3.2 | 65 | | 5 | 4 | 6 | | | 5 | 4 | 6 | 5 |
| 5.1 | 96 | | | | | | | | 4 | | |
| 10.8 | 90 | 5 | | | | | | 5 | | | |
| 10.0 | 80 | 2 | 6 | 2 | 5 | | | 1 | | 4 | |
| 1.8 | 80 | | 5 | | | | | | | 15 | |
| 2.6 | 84 | | | 11 | | | | | | 5 | |
| 3.3 | 80 | 2 | | | 10 | | | | 2 | | 6 |
| 12.0 | 90 | | | | 7 | 0.3 | | 3 | | | |
| 5.4 | 69 | 2 | 20 | 2 | 1 | | | | | 3 | 3 |
| 6.0 | 91 | | | 4 | | | | | | 5 | |

TABLE II

| Dye Content | Water | PG | DEG | NMP | CET | TBT | TDG | BDL | PHO | 2P | PI2 |
|---|---|---|---|---|---|---|---|---|---|---|---|
| 3.0 | 80 | 15 | | | 0.2 | | | | | 5 | |
| 9.0 | 90 | | 5 | | | | | | 1.2 | | 5 |
| 1.5 | 85 | 5 | 5 | | 0.15 | 5.0 | 0.2 | | | | |
| 2.5 | 90 | | 6 | 4 | | | | | 0.12 | | |
| 3.1 | 82 | 4 | 8 | | 0.3 | | | | | | 6 |
| 0.9 | 85 | | 10 | | | | | 5 | 0.2 | | |
| 8.0 | 90 | | 5 | 5 | | | 0.3 | | | | |
| 4.0 | 70 | | 10 | 4 | | | | 1 | | 4 | 11 |
| 2.2 | 75 | 4 | 10 | 3 | | | | 2 | | 6 | |
| 10.0 | 91 | | | 6 | | | | | | | 3 |
| 9.0 | 76 | | 9 | 7 | | 3.0 | | | 0.95 | 5 | |
| 5.0 | 78 | 5 | 11 | | | | | | | 6 | |
| 5.4 | 86 | | | 7 | | | | | | 7 | |
| 2.1 | 70 | 5 | 5 | 5 | 0.1 | 0.2 | 0.1 | 5 | 0.1 | 5 | |
| 2.0 | 90 | | | 10 | | | | | | | |
| 2 | 88 | | | | | | 10 | | | | |
| 5 | 78 | | | 5 | | | 12 | | | 5 | |
| 8 | 70 | 2 | | 8 | | | 15 | | | 5 | |

TABLE II-continued

| Dye Content | Water | PG | DEG | NMP | CET | TBT | TDG | BDL | PHO | 2P | PI2 |
|---|---|---|---|---|---|---|---|---|---|---|---|
| 10 | 80 | | | | | | 8 | | | 12 | |
| 10 | 80 | 10 | | | | | | | | | |

What is claimed is:

1. A compound of Formula (1) and salts thereof:

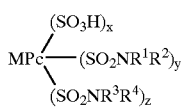

Formula (1)

wherein:

M is 2H, Si, a metal, an oxymetal group, a hydroxymetal group or a halometal group;

Pc represents a phthalocyanine nucleus of Formula (2);

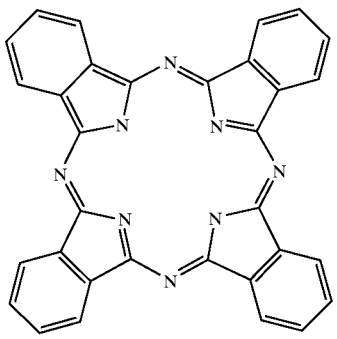

Formula (2)

$R^1$, $R^2$ and $R^3$ independently are H or optionally substituted $C_{1-4}$ alkyl;

$R^4$ is an optionally substituted cyclic or an optionally substituted acyclic alkene optionally interrupted with a hetero atom;

x and z are both greater than 0;

y is 0 to 4; and the sum of (x+y+z) is 2 to 5.

2. A compound according to claim 1 wherein M is Cu or Ni.

3. A compound according to either claim 1 or claim 2 where $R^4$ is optionally substituted $C_{2-18}$ straight or branched chain alkylene alkene.

4. A compound according to claim 3 where $R^4$ is optionally substituted $C_{3-6}$ straight chain alkene.

5. A compound according to either claim 1 or 2 where $R^4$ is an optionally substituted $C_{2-18}$ straight or branched chain alkene interrupted with NH.

6. A compound according to claim 1 or claim 2 where $R^4$ is $(CH_2)_n NH(CH_2)_p CH=CH(CH_2)_q H$ wherein n is 1 to 3, and p and q are each independently 0 or 1.

7. A compound according to claim 1 or claim 2 wherein the sum of (x+y+z) is 3 to 4.

8. A composition comprising a compound as described in claim 1 and a liquid medium.

9. A composition according to claim 8 wherein the liquid medium comprises water, a mixture of water and organic solvent or organic solvent free from water.

10. A composition according to either claim 8 or claim 9 that is an ink suitable for use in an ink-jet printer.

11. A process for forming an image on a substrate comprising applying an ink according to claim 10 of the invention thereto by means of an ink-jet printer.

12. A substrate printed with a compound according to claim 1.

13. An ink-jet printer cartridge comprising a chamber and an ink wherein the ink is in the chamber and the ink is as described in claim 10.

14. A substrate printed with a composition according to claim 8.

15. A substrate printed by a process according to claim 11.

* * * * *